(12) United States Patent
Hakewill

(10) Patent No.: US 8,239,620 B2
(45) Date of Patent: Aug. 7, 2012

(54) MICROPROCESSOR WITH DUAL-LEVEL ADDRESS TRANSLATION

(75) Inventor: James Robert Howard Hakewill, San Jose, CA (US)

(73) Assignee: Mips Technologies, Inc., Sunnyvale, CA (US)

( * ) Notice: Subject to any disclaimer, the term of this patent is extended or adjusted under 35 U.S.C. 154(b) by 54 days.

(21) Appl. No.: 12/891,503

(22) Filed: Sep. 27, 2010

(65) Prior Publication Data

US 2012/0079164 A1    Mar. 29, 2012

(51) Int. Cl.
G06F 12/00    (2006.01)

(52) U.S. Cl. ........ 711/106; 711/156; 711/205; 718/104; 718/108

(58) Field of Classification Search .................. 711/106, 711/156, 205; 718/104, 108
See application file for complete search history.

(56) References Cited

U.S. PATENT DOCUMENTS

| | | | | |
|---|---|---|---|---|
| 6,175,898 B1 * | 1/2001 | Ahmed et al. | ................ | 711/137 |
| 6,490,658 B1 * | 12/2002 | Ahmed et al. | ................ | 711/140 |
| 6,532,528 B1 * | 3/2003 | Nishimoto et al. | ........... | 711/207 |
| 7,069,413 B1 * | 6/2006 | Agesen et al. | ................ | 711/207 |
| 7,171,539 B2 * | 1/2007 | Mansell et al. | ................ | 711/203 |
| 7,945,761 B2 * | 5/2011 | Subrahmanyam et al. | ... | 711/206 |
| 8,024,506 B1 * | 9/2011 | Agesen et al. | .................... | 711/6 |
| 8,140,820 B2 * | 3/2012 | Mansell et al. | ................ | 711/202 |
| 2004/0225840 A1 * | 11/2004 | O'Connor et al. | ............ | 711/122 |
| 2012/0011342 A1 * | 1/2012 | Ingle et al. | .................... | 711/207 |

OTHER PUBLICATIONS

Popek, et al. "Formal requirements for virtualizable third generation architectures." Communications of the ACM, 17:7 pp. 412-421 (Jul. 1974).
VMWARE Whitepaper. "Understanding full virtualization, paravirtualization and hardware assist." 17 pp. (2007).
Fisher-Ogden. "Hardware support for efficient virtualization." 12 pp. (2007).
Intel. "Intel virtualization technology: hardware support for efficient processor virtualization." 10:03 14 pp. (Aug. 10, 2006).

* cited by examiner

*Primary Examiner* — Stephen Elmore
(74) *Attorney, Agent, or Firm* — Cooley LLP

(57) ABSTRACT

A processor includes a first translation look-aside buffer to support a guest operating mode. A second translation look-aside buffer supports a root operating mode. Hardware resources support the guest operating mode as controlled by guest mode control registers defining guest context. The guest context is used by the hardware resources to access the first translation look-aside buffer to translate a guest virtual address to a guest physical address. The hardware resources access the second translation look-aside buffer to translate the guest physical address to a physical address.

12 Claims, 10 Drawing Sheets

MICROPROCESSOR WITH DUAL-LEVEL ADDRESS TRANSLATION

CROSS-REFERENCE TO RELATED APPLICATION

This application shares a common specification with the commonly owned and concurrently filed patent application entitled "Microprocessor System for Virtual Machine Execution", Ser. No. 12/891,530 filed Sep. 27, 2010.

FIELD OF THE INVENTION

This invention relates generally to microprocessors. More particularly, this invention relates to a microprocessor with extended operating modes to support virtual machine execution.

BACKGROUND OF THE INVENTION

A traditional computer operating system (OS) shares the resources of a single machine between multiple user programs or applications. The OS kernel controls all system resources, including execution time, access to instruction and data memory, I/O devices, and inter-process communication. The system resources typically include a microprocessor with at least two levels of privilege, a set of privileged machine-control instructions and registers, a virtual memory system using address translation, and an exception system.

Virtualization is a technique by which multiple operating systems share a single machine. Each "guest" operating system runs within a virtual machine (VM), which appears to have the same privileged instructions, registers and I/O devices as the real machine, but this appearance is an illusion managed by a piece of software known as a hypervisor. The hypervisor is in full control of machine resources at all times. Guest operating systems no longer have unrestricted access to machine resources—they are "de-privileged". All operations performed by a guest must be explicitly permitted by the hypervisor.

The hypervisor is responsible for sharing system resources between multiple VMs, and maintaining the expected behavior of each VM. The hypervisor performs the same basic functions as the traditional OS kernel, except that the hypervisor's clients are full operating systems rather than user applications.

FIG. 1 illustrates a prior art virtualization system 100. The system 100 includes a first set of applications 102_1 through 102_N executing on a first operating system 104, and a second set of applications 106_1 through 106_N operating on a second operating system 108. A hypervisor 110 operates between the operating systems 104 and 108 and a set of hardware resources 112_1 through 112_N. In particular, the hypervisor 110 controls access to the hardware resources 112 while executing functions specified by the applications. The hardware resources 112 may be a central processing unit, a graphics processing unit, memory, input/output devices, and the like.

The traditional approach to virtualization for a microprocessor with two levels of privilege (e.g., user and kernel) is known as de-privileging. With de-privileging, a guest operating system kernel is executed in user mode instead of the expected kernel mode. Accesses to a privileged resource from the guest kernel results in an exception (trap) that is handled (emulated) by the hypervisor. This scheme is possible if all privileged operations result in exceptions when executed from user mode, and the full user-mode address space can be translated. The performance of such a trap-and-emulate system is limited by the many hypervisor exceptions that must be processed.

In view of the foregoing, it would be desirable to provide an improved microprocessor to efficiently execute virtualized guest operating systems under the control of a hypervisor. More particularly, it would be desirable to reduce hypervisor software processing operations through utilization of improved microprocessor virtualization resources that support virtual machine execution.

SUMMARY OF THE INVENTION

A processor includes a first translation look-aside buffer to support a guest operating mode. A second translation look-aside buffer supports a root operating mode. Hardware resources support the guest operating mode as controlled by guest mode control registers defining guest context. The guest context is used by the hardware resources to access the first translation look-aside buffer to translate a guest virtual address to a guest physical address. The hardware resources access the second translation look-aside buffer to translate the guest physical address to a physical address.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
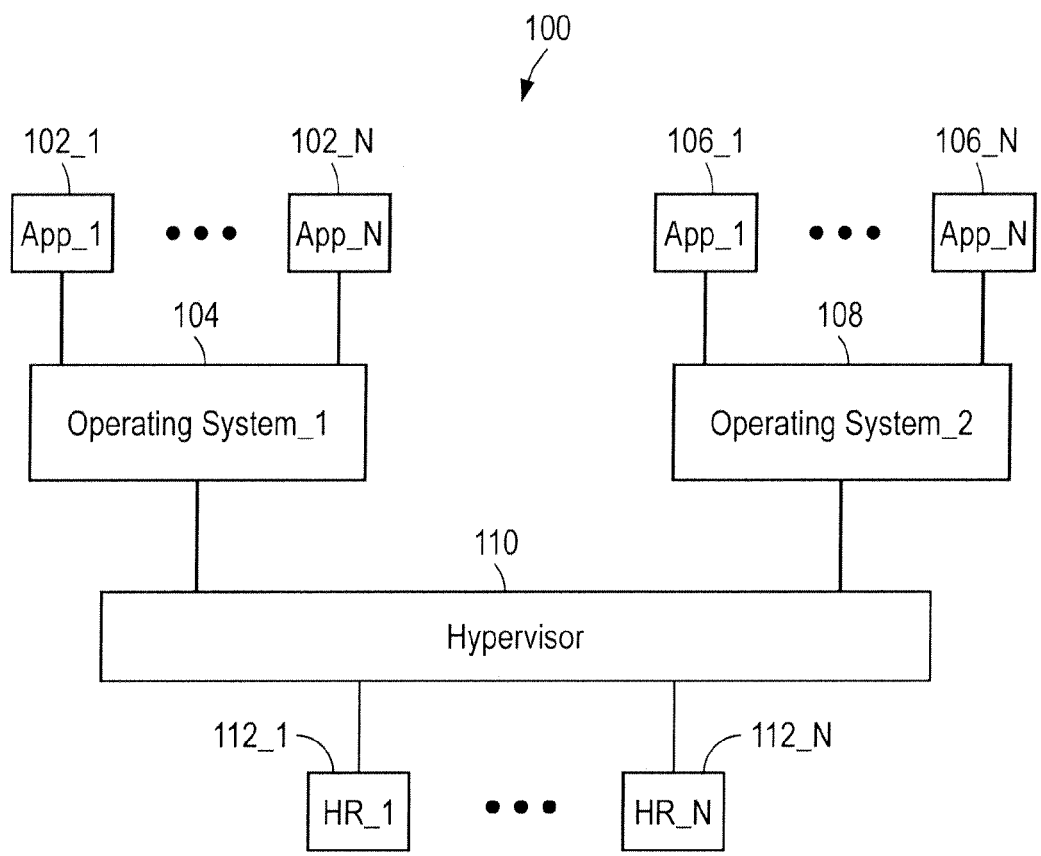
FIG. 1 illustrates a prior art virtualization system.

Microprocessor architectures have well defined operating modes. For example, MIPS Technologies, Inc., Sunnyvale, Calif., sells microprocessor IP designs with pre-existing kernel, user and supervisor operating modes that can be referred to as root-kernel, root-user and root-supervisor respectively.

Processor behavior during kernel and user mode execution is controlled by privileged machine state. This state may be read or written only in kernel mode. An attempt to access privileged state from user mode results in an exception, returning control to kernel mode. Privileged machine state includes, but is not limited to, the operating mode of the processor, address translation and virtual memory controls, debug and breakpoint configuration and power management controls. The set of privileged machine-control state is referred to as privileged context.

The invention supports virtualized guests in the form of a limited privilege guest mode, which is orthogonal to existing kernel, supervisor and user modes. The guest mode comprises guest-kernel, guest-supervisor and guest-user modes. This results in six privilege levels: root-kernel, root-supervisor, root-user, guest-kernel, guest-supervisor and guest-user. The supervisor mode is generally omitted from the figures for simplicity. A hypervisor has access to all machine resources. The guest-kernel level is granted access to virtualized machine resources, controlled by the hypervisor. The guest-user level is equivalent to the existing unprivileged user mode, except that user/kernel transitions within the guest OS are made between the guest-user and guest-kernel.

The guest mode allows the separation between kernel, user and supervisor modes to be retained for a guest operating system running within a virtual machine. The guest-kernel mode has sufficient privilege to handle guest interrupts and guest exceptions, and to manage virtual memory for guest processes. The separation between root mode and the limited-privilege guest mode allows root mode software to be in full control of the machine at all times. Thus, backward compatibility is retained for existing software running in root mode.

Known virtualization solutions use context switching to enable transitions between guest and non-guest modes. A common set of privileged machine state is used by both guest and non-guest modes. Transitions between root and guest modes are performed by context switching the contents of entering and exiting contexts. For example, the privileged state of the exiting mode is written out to an area of memory and the privilege state of the entering mode is restored from a different area of memory. This is computationally expensive.

In contrast, the invention utilizes operating mode bits and simultaneously active states. That is, the privileged contexts of both root and guest modes are simultaneously active in the machine.

Alternate virtualization solutions add guest-specific registers to the privileged state, which determine which parts of the privileged state may be accessed when in guest mode. Some systems add shadow registers at unused locations, which are used in place of existing privileged registers when in guest mode. In contrast, the invention utilizes a separate privileged context used when executing in guest mode, which can in addition be accessed from a root mode. All privileged registers in the guest context are in the same locations as in the root context. The invention uses existing machine state for exception context, saving on guest-exit interrupts, and new state within the added guest context for exceptions handled within the guest.

Other systems utilize extra registers to control access to certain features, and sometimes add shadow registers for use in guest mode. These extra registers are placed at different locations from the root-mode equivalents, since both sets must be accessible in root mode. When limited privileged register space is available, the system is sub-optimal and may not have room to virtualize more registers in the future. In contrast, the invention adds a whole other context, so everything is where you would expect, and if new privileged registers are added, the location of the virtualized versions is obvious.

Figure 2:
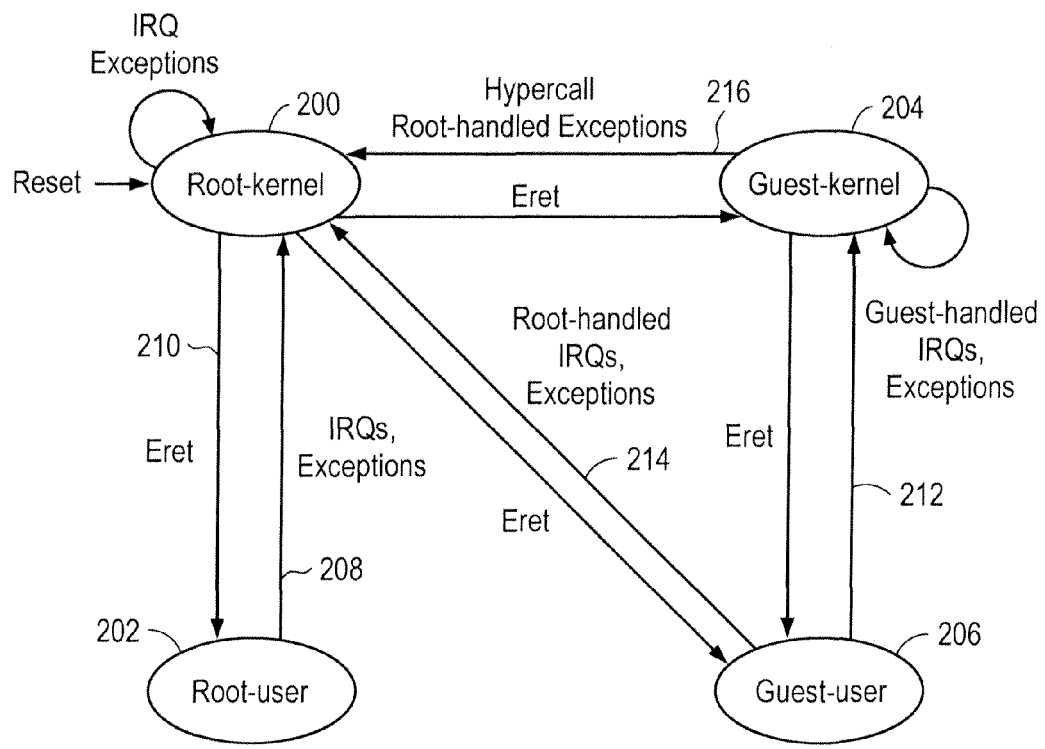
FIG. 2 illustrates root and guest state transitions implemented in accordance with an embodiment of the invention.

FIG. 2 illustrates transitions between operating modes of the invention. The figure illustrates root-kernel mode 200 and root-user mode 202. The root-kernel mode handles interrupt requests (IRQs) and exceptions generated in the root-kernel mode 200, as well as those generated in the root-user mode 202. As shown with arrow 208, an IRQ or exception generated in the root-user mode 202 is passed to the root-kernel mode 200 for processing. The results are passed with a return from exception (ERET) instruction, as shown with arrow 210.

FIG. 2 also illustrates a guest-kernel mode 204 and a guest user mode 206. Exceptions generated in guest-kernel mode can be handled by guest-kernel mode (arrow back to itself), or by root-kernel mode as indicated with arrow 216. Exceptions generated in guest-user mode may be handled by the guest-kernel 204, as indicated with arrow 212, or may be handled by root-kernel mode as indicated with arrow 214. Return from the exception handler is performed with an ERET instruction. The mode (guest-kernel or root-kernel) in which the exception is handled is determined from how the exception was generated. If a setting within the guest-mode privileged context caused the exception to be generated, the exception is handled within guest mode. If a setting within the root-mode privileged context caused the exception to be generated, the exception is handled in root mode.

Thus, operations originating inside the guest virtual machine (e.g., instruction execution, memory access requests) must first be checked against the guest privileged context and then checked against the root privileged context.

The invention allows for an immediate exit from guest mode to a fully functioning root mode without the need for a time-consuming context switch. The system provides a software architecture where the relationship between the hypervisor and a guest kernel corresponds to the well understood relationship between an operating system kernel and a user mode process. The system provides a virtualized privileged resource architecture for guest mode execution which corresponds to the well-understood privileged resource architecture which exists for root mode.

An embodiment of the invention provides for state transitions into the virtual guest mode (guest entry), out of the virtual guest mode (guest exit), and transitions within the guest mode itself. These transitions are enabled with a minimum of disturbance to pre-existing instruction sets that rely upon the expression of the current processor state as the product of a base mode field and exception state fields (e.g., the MIPS architecture). In the MIPS Instruction Set Architecture, the operating mode of the processor is determined from a base mode field status [KSU] (also known as Status [UM]), and exception status fields Status [EXL] and Status [ERL]. The processor is operating in user mode (the lowest level of privilege) when the Status [KSU] field indicates that the base operating mode is user mode, and neither of the exception status fields Status [EXL] or Status [ERL] is set to true. The processor is operating in kernel mode (the highest level of privilege) when the Status [KSU] field indicates that the base operating mode is kernel mode, or either of the exception status fields Status [EXL] or Status [ERL] is set true.

The exception-status bit EXL is set when an exception is detected (including interrupts), during the state transition which results in program flow being redirected to the exception vector. The error-status bit ERL is set when an error condition is detected, during the state transition which results in program flow being redirected to the error condition vector. The exception-return instructions ERET clears the status [ERL] bit if it is set, or clears the Status [EXL] bit if it is set.

This mechanism preserves the operating mode being used when an exception or error occurs. It allows simple exception exit to be achieved by using the ERET instruction. It also allows state changes to be achieved under program control. Kernel-mode code can write the status register directly, setting status [EXL] true and setting Status [KSU] field to the desired state. This leaves the processor in kernel mode, but a subsequent ERET instruction will cause an atomic transition into the desired state along with a jump to the address held in the exception-return program counter register (EPC).

The same approach is utilized when a virtual guest operating mode is added to the instruction set architecture. The virtual guest operating mode is provided with a partially populated privilege machine state context. At a minimum, this consists of the register containing the user/kernel mode field. In the MIPS Instruction Set Architecture, this is the Status register. The non-guest operating mode is referred to as root mode. The root-context Status register is referred to as Root.Status. The guest-context Status register is referred to as Guest.Status. The base guest/non-guest operating mode of the processor is indicated by a field located within a root-context register, GuestControl [GM].

An address translation system controlled by root mode is in operation when the processor is executing in a guest mode. The physical address space seen by the guest can thus be translated under root control.

The transitions between modes are arranged to allow for use of unmodified exception handlers for exceptions triggered in root mode, use of unmodified exception handlers for exceptions triggered and handled in guest mode, and use of existing exception vectors and exception handling techniques for exceptions triggered in guest mode, but which are handled in root mode.

The operating mode of the processor is determined from a root-context base mode field Root.Status [KSU] (also known as Root.Status UM]), exception status fields Root.Status [EXL] and Root.Status [ERL], and a root-context guest-mode field Root.GuestControl [GM], plus guest-context base mode field Guest.Status [KSU] (also known as Guest.Status [UM]), exception status fields Guest.Status [EXL] and Guest.Status [ERL].

The processor is operating in a root mode (root-user or root-kernel) when it is not in a guest mode. The processor is operating in a guest mode (guest-user or guest-kernel) when neither of the exception status fields Root.Status [EXL] or Root.Status [ERL] is set true, and the Root.GuestControl [GM] bit is set true. After it is determined whether the processor is in a guest or root mode, the actual operating mode is determined from the bits in the status register of the current context—either Root.Status or Guest.Status.

The truth table below shows various state bits and resulting operating modes that maybe utilized in accordance with an embodiment of the invention.

| a | b | c | d | e | f | g | Mode |
|---|---|---|---|---|---|---|------|
| X | X | 1 | X | X | X | X | Root-Kernel |
| X | X | X | 1 | X | X | X | Root-Kernel |
| 0 | K | 0 | 0 | X | X | X | Root-Kernel |
| 0 | S | 0 | 0 | X | X | X | Root-Supervisor |
| 0 | U | 0 | 0 | X | X | X | Root-User |
| 1 | X | 0 | 0 | X | 1 | X | Guest-Kernel |
| 1 | X | 0 | 0 | X | X | 1 | Guest-Kernel |
| 1 | X | 0 | 0 | K | 0 | 0 | Guest-Kernel |
| 1 | X | 0 | 0 | S | 0 | 0 | Guest-Supervisor |
| 1 | X | 0 | 0 | U | 0 | 0 | Guest-User | a = Root.GuestControl [GM]
b = Root.Status [KSU]
c = Root.Status [ERL]
d = Root.Status [EXL]
e = Guest.Status [KSU]
f = Guest.Status [ERL]
g = Guest.Status [EXL]
K = Kernel
S = Supervisor
U = User
X = Don't care During guest mode execution, when an exception is detected which should be handled in root mode, the root mode exception status field Root.Status [EXL] is set, thus causing an immediate exit from guest mode. When the handler is complete, the ERET instruction (executed in root mode) clears Root.Status [EXL], and thus the processor is returned to guest mode. No changes are required to the guest-mode exception state, hence exceptions returning to root mode can be taken at any time within the guest, even during a guest-mode exception handler. The technique allows identical virtual addresses to be used for exception vector locations in both guest and root modes. The guest's address space is translated under root control, thereby allowing the virtual addresses of exception vectors to be identical between guest and root, whereas different physical addresses are used depending on the context.

Figure 3:
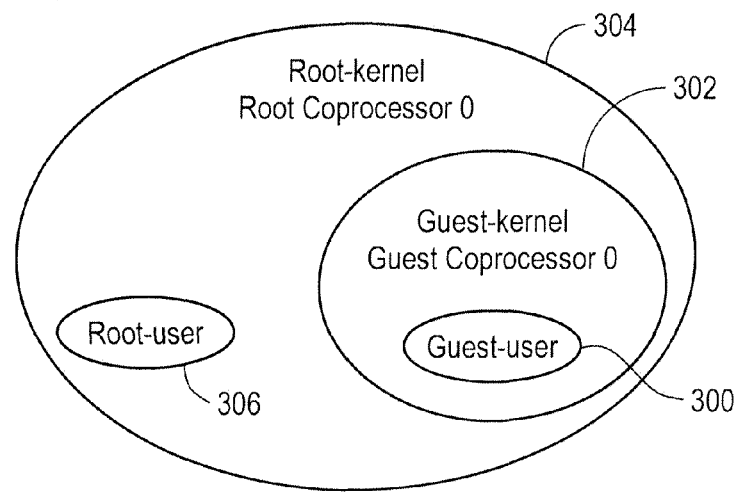
FIG. 3 illustrates concentric rings of virtualization control utilized in accordance with an embodiment of the invention.

The handling of interrupts and exceptions is handled through concentric modes of control, as shown in FIG. 3. The invention may be characterized as having an 'onion model'. The 'onion model' references concentric regions of control to address translation and exception handling for guests. Three operating modes execute a virtualized guest operating system: unprivileged guest-user 300, limited-privilege guest-kernel 302 and full-privilege root-kernel 304. The root-user mode 306 is used to execute non-virtualized software. At each layer within the onion, any operation must be permitted by all outer layers.

The duplication and simultaneous operation of hardware resources and use of the 'onion model' allow for a relatively simple hypervisor with a minimum of hypervisor interventions. The system allows for handling of common tasks, such as interrupt enable/disable and exception handling entirely within the guest. The guest and hypervisor maintain separate and independent page tables, as discussed below. The hypervisor need not have knowledge of how the guest manages address translation. The root interrupt system continues to operate as before and is not affected by the guest.

The invention allows for a full or partial duplication of the privileged context. In the minimal case, the privileged register containing the user/kenel mode state is duplicated within the guest context, thus enabling the use of guest-kernel and guest-user modes. No other privileged registers are duplicated and access to privileged resources results in an exception back to root mode for emulation.

In the maximal case, all privileged features available to the root are duplicated, allowing for guest use of address translation, timers, interrupt controls, hardware breakpoints and the like without hypervisor intervention. The root context is provided with mechanisms to control translation of guest operations (e.g., interrupt forwarding) and mechanisms to trap on certain events encountered during guest execution (e.g., a reserved instruction exception within the guest).

An exception to the hypervisor is required only when an exception is triggered by the root privileged state, such as an address translation exception from the root-mode (second level) address translation system, a root-mode hardware breakpoint, or an external interrupt enabled in the root context.

A typical implementation of the invention populates the guest privileged context with some or all of the following: the user/kernel control, global interrupt disable control, address translation controls, interrupt system configuration and a system timer.

In a MIPS processor, Coprocessor 0 contains system control registers, and can be accessed only by privileged instructions. A processor implementing operations of the invention (sometimes referred to as a Virtualization technique) contains two Coprocessor 0 (CP0) contexts—a root CP0 context and a guest CP0 context. The term 'context' refers to the software visible state held within each Coprocessor 0. The software-visible state is the contents of status/control registers, and any state which is accessed through those control registers, such as TLB entries and Segmentation Configurations. An aspect of the invention is that the system operates with multiple active contexts. That is, guest operating mode behavior is simultaneously controlled by guest context specified in the guest mode control registers and root context specified in root mode control registers.

During guest mode execution, all guest operations are first tested against the guest CP0 context, and then against the root CP0 context. An 'operation' is any process which can trigger an exception. This includes address translation, instruction fetches, memory accesses for data, instruction validity checks, coprocessor accesses and breakpoints.

The guest CP0 context includes registers for processor status, exception state and timer access. Depending on the options chosen by the implementation, the guest CP0 context can also include registers to control a TLB and registers to control segmentation and hardware page table walking within the guest context.

The separate CP0 context for the guest reduces the context switch overhead when transitioning between root and guest modes. An interrupt or exception causing an exit from guest mode can be immediately handled using the original (root) CP0 context without additional context switching. The guest CP0 context is partially populated. Guest accesses to registers which are not included can be emulated by a hypervisor, handling the exceptions taken from guest mode. The registers chosen to be included in the guest CP0 context are either necessary to control guest mode operation or are so frequently accessed by guest kernels that trap-and-emulate is impractical.

Guest mode software has no access to the root Coprocessor 0. Root mode software can access the guest Coprocessor 0, and if required can emulate guest-mode accesses to disabled or unimplemented features within guest Coprocessor 0. The guest Coprocessor 0 is partially populated with only a subset of the complete root Coprocessor 0.

The presence of two Coprocessor 0 contexts allows for an immediate switch between guest and root modes, without requiring a context switch to/from memory. Simultaneously active contexts for the guest and root Coprocessor 0 allows guest-kernel privileged code to execute with minimal hypervisor intervention and ensures that key root-mode machine systems such as timekeeping, address translation and external interrupt handling continue to operate without major changes during guest execution.

Figure 4:
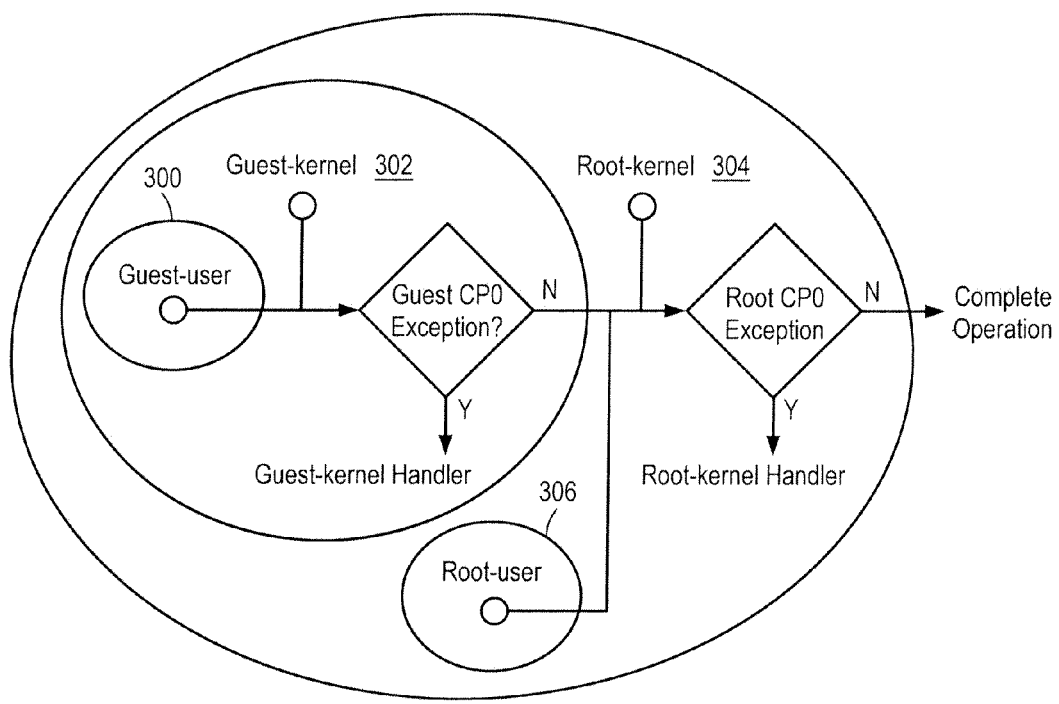
FIG. 4 illustrates exception handling utilized in accordance with an embodiment of the invention.

FIG. 4 shows the how the Virtualization 'onion model' is applied to operations starting in each of the operating modes (supervisor modes are omitted for clarity). An operation executed in guest-user mode 300 must travel from inside of the onion to the outside. That is, an operation executed in guest-user mode 300 must be verified through concentric rings of control.

The first layer to be crossed from the guest-user mode 300 is the guest CP0 context (controlled by guest-kernel mode software 302). All exception and translation rules defined by the guest CP0 context are applied, and resulting exceptions are taken in guest mode.

If the operation does not trigger a guest-context exception, the next layer to be crossed is the root CP0 context (controlled by root-kernel mode software 304). All exception and translation rules defined by the root CP0 context are applied, and resulting exceptions are handled in root mode. For example, in a MIPS system, an access to Coprocessor 1 (the Floating Point Unit) must first be permitted by a guest context status bit, and then by a root context status bit. External interrupts travel from the outside of the onion to the inside—first being parsed by the root CP0 context, and if passed on by the hypervisor software (through hardware or software means), by the guest CP0 context.

The Virtualization technique provides root-mode software with controls over the instructions that can be executed, the registers which can be accessed, and the interrupts and exceptions which can be taken when in guest mode. These controls are combined with new exceptions that return control to root mode when intervention is required. The overall intent is to allow guest-mode software to perform the most common privileged operations without root-mode intervention—including transitions between kernel and user mode, controlling the virtual memory system (the TLB) and dealing with interrupt and exception conditions. Controls allow root-mode software to enforce security policies, and allow for virtualized features to be provided using direct access or trap-and-emulate approaches.

The features added by the Virtualization technique are primarily directed toward virtualizing the privileged state of the machine and dealing with related exception conditions. Hence most features are related to guest-mode interaction with Coprocessor 0. A partially-populated Coprocessor 0 context is added for guest-mode use.

The Virtualization technique provides controls to trigger an exception on any access to Coprocessor 0 from the guest, access to a particular register or registers, or to trigger an exception after a particular field has been changed.

The guest Coprocessor 0 context can include its own interrupt system. Root-mode software can directly control guest interrupt sources, and can also pass through one or more real hardware interrupts. Guest mode software can enable or disable its own interrupts to enforce critical regions. The root-mode interrupt system remains active, allowing timer and external interrupts to be dealt with by root-mode handlers at any time.

The guest context may optionally include its own translation look-aside buffer (TLB). This is useful for fully virtualized systems, where direct guest access to the TLB is necessary to maintain performance. A two-level address translation system is present, along with the related exception system. This system is used to manage guest mode access to virtual and physical memory, and then to relate those accesses to the real machine's physical memory. All MIPS unprivileged instructions and registers can be used by guest mode software without restriction. This includes the General Purpose Registers (GPRs) and multiplier result registers hi and lo.

MIPS defines optional architecture features and Application Specific Extensions (ASEs) which add machine state and instructions to the base MIPS architecture. Some examples include the Floating Point Unit, the DSP ASE, and the User-Local register. The presence of these optional features and ASEs within the machine is indicated by read-only configuration bits in root configuration registers.

The Virtualization technique allows implementations to choose which optional features are available to the guest context. The optional features available to the guest are indicated by fields in the configuration registers within the guest context. Root-mode software can control whether guest software is allowed access to configuration registers within the guest context. When access is not permitted, a hypervisor can use a trap-and-emulate technique to return whatever configuration-register values should be seen by the guest.

An implementation can further choose to allow run-time configuration of the features available to the guest by allowing root-mode writes to fields in the guest-context configuration registers. In other words, configuration registers that are read-only in the guest mode can be written to by root mode software—and the implementation supports run-time configuration. Thus, the hard-wired indicative function of the read-only configuration registers is changed into a software configuration function. In other words, there are configuration registers that are read-only in the guest mode, but are used in the root mode to change behavior. A guest mode configuration register (meaning a register which describes how the underlying hardware is configured) is writeable from the root.

In a fully virtualized system, the virtual machine presented to the guest is a faithful copy of a real machine—all processor state, instructions, memory and peripherals operate as expected by the guest software. In a para-virtualized system, the virtual machine is a combination of processor state and instructions, and a set of services provided to the guest by the hypervisor are accessed through an Application Programming Interface (API).

The Virtualization technique supports both approaches, by allowing unrestricted access to unprivileged state, and by controlling access to privileged state for exception-free operation, but also allowing root-mode software to intervene where necessary.

Figure 5:
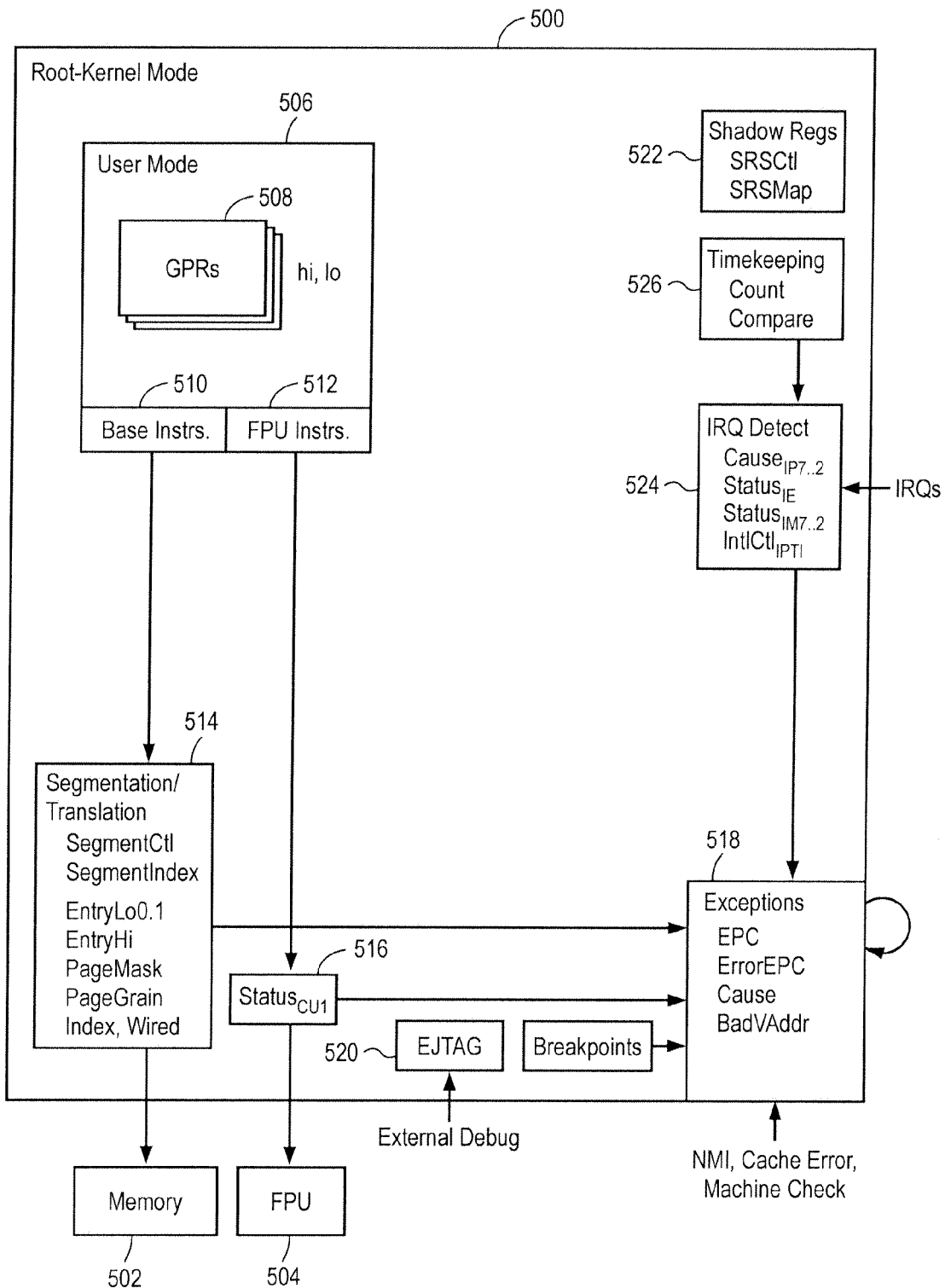
FIG. 5 illustrates a processor that may be augmented to implement an embodiment of the invention.

FIG. 5 shows a simplified MIPS processor during root mode execution. The processor 500 interfaces with external functional units, such as a memory 502 and floating-point unit 504. The user mode 506 has an associated set of general purpose registers 508. The user mode 506 supports base instructions 510 and FPU instructions 512. A segmentation/translation block 514 performs address translation using a TLB-based MMU and Segment Configurations. Access to the FPU 504 is controlled by kernel-mode software using a bit in status register 516. The processor 500 also includes an exception processing block 518 and an EJTAG interface 520 for tracing and debugging.

Values in the shadow register 522 control which General Purpose Register 508 set is used. The processor also includes interrupt detection circuitry 524 and timekeeping circuitry 526. Interrupts can result from external sources or the system timer. Exceptions can result from address translation, breakpoints, instruction execution, or serious errors such as Machine Check or Cache Error.

Figure 6:
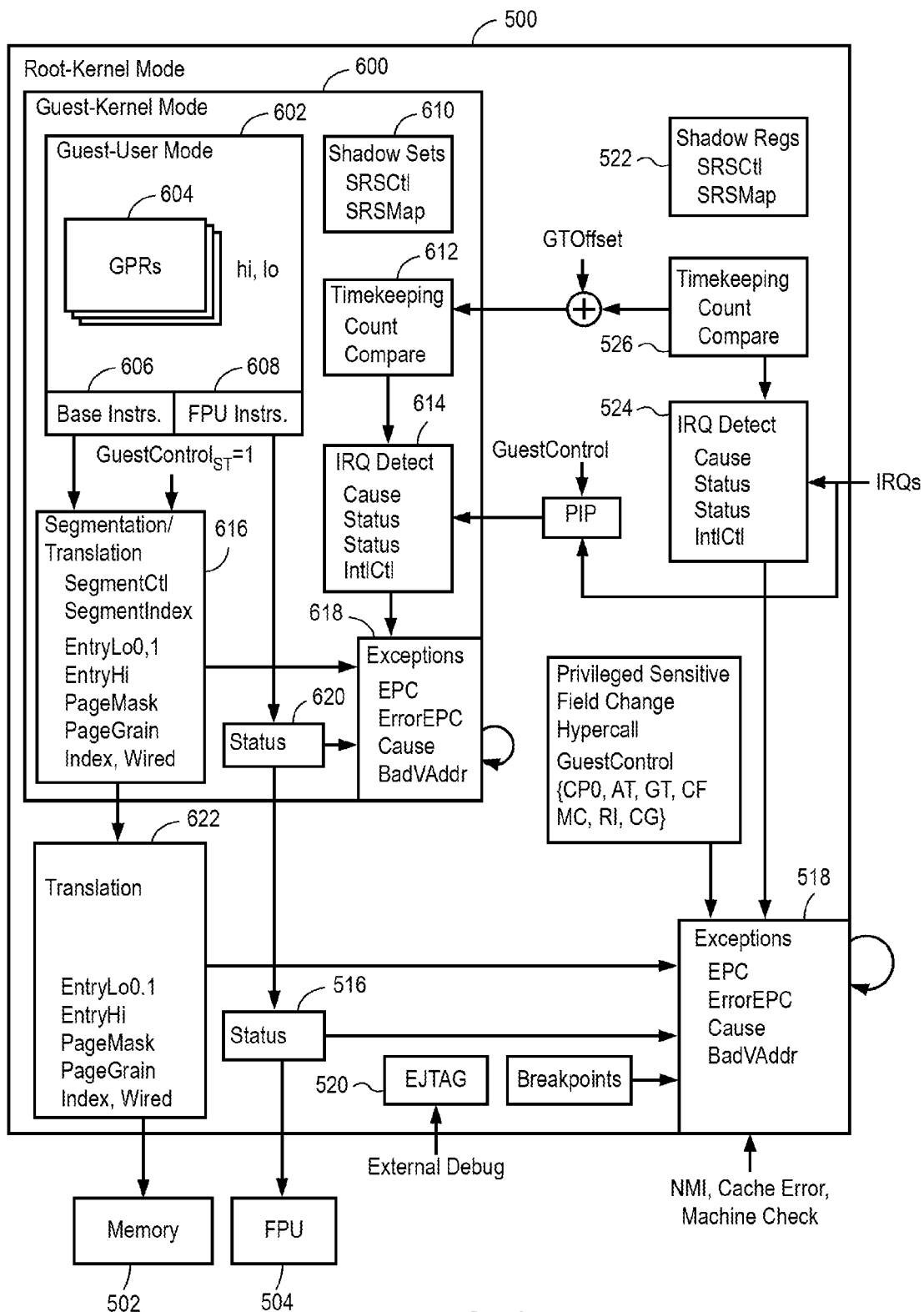
FIG. 6 illustrates a processor implemented to host a fully virtualized guest in accordance with an embodiment of the invention.

FIG. 6 shows the Virtualization 'onion model' applied to the simplified MIPS processor from FIG. 5 for a fully virtualized guest. Observe that the root-kernel mode 500 is the outer control layer with a nested guest-kernel mode 600 and guest-user mode 602. The guest-user mode 602 has general purpose registers 604 and associated base instructions 606 and FPU instructions 608. The guest-kernel mode 600 has a segmentation/translation block 616 to perform address translation using a TLB-based MMU with hardware page table walking and Segment Configurations. The guest-kernel mode 600 also has processing blocks corresponding to those of the root-kernel mode 500 of FIG. 5, including shadow registers 610, time keeping circuitry 612, interrupt detection circuitry 614, exception handling circuitry 618 and a status register 620.

The root-kernel model 500 has a translation block 622 without segmentation, since segmentation operations are performed in segmentation block 616. The translation block 616 performs address translation using a TLB-based MMU with optional hardware page table walking.

Guest context shadow registers 610 determine which General Purpose Registers 604 are used. Multiplier result registers are accessible in user and kernel modes. Address translation is performed by initially using the guest context, then the root context translation TLB. Root context segment configurations are not used—the root context TLB translates every address from the guest. Exceptions detected by the guest context are handled in guest mode using guest-context instructions and registers for controlling guest segmentation/translation, guest coprocessor enables, guest timekeeping, and IRQs. Exceptions detected by the root context are handled in root mode using root-context instructions and registers for controlling root timekeeping, coprocessor enables and second-level address translation, plus additional root-context controls over guest behavior.

Figure 7:
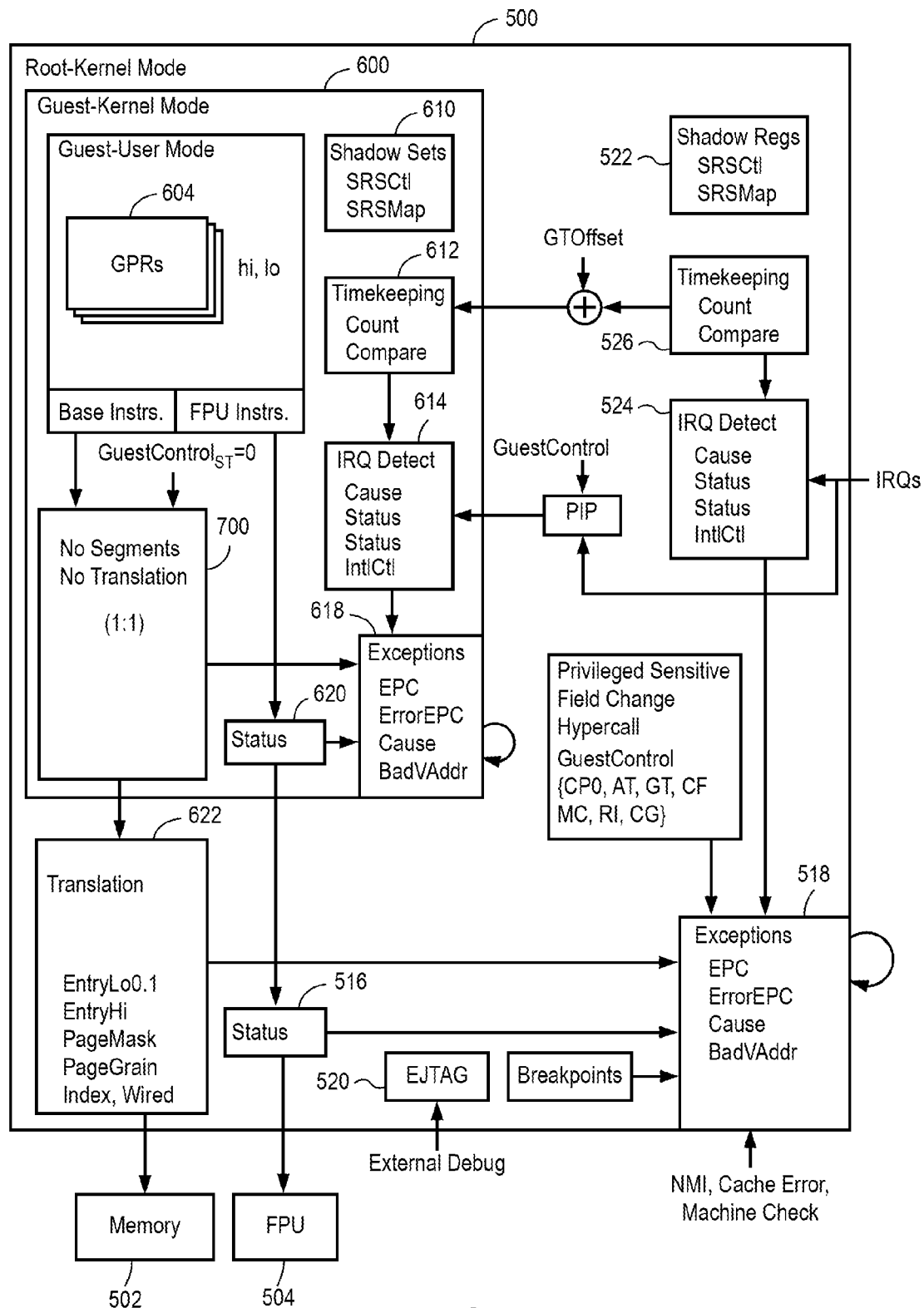
FIG. 7 illustrates a processor implemented to host a para-virtualized guest in accordance with an embodiment of the invention.

FIG. 7 shows the Virtualization 'onion model' applied to the simplified MIPS processor from FIG. 5, for a para-virtualized guest. In this case, the guest context does not have Segmentation/Translation enabled, as indicated at block 700. Every guest address is translated through the root context TLB. Note that root context Segment Configurations are not use—the root context TLB translates every address from the guest.

Shadow registers, timekeeping and interrupt systems operate in the same way as for a fully virtualized guest.

The Virtualization technique defines a set of extensions to the MIPS Privileged Resource Architecture for programmable segmentation, acceleration for TLB exception handling, and kernel-only TLB pages. These extensions benefit both virtualized and non-virtualized operating systems. The Virtualization technique also defines a memory model for efficient execution of paravirtualized and fully virtualized guest operating systems.

Address Translation is the process of obtaining a physical address (PA) from a virtual address (VA). In the MIPS Privileged Resource Architecture (PRA), this translation can be performed using segmentation and TLB-based translation, block address translation (BAT) or a fixed-map translation MMU (FMT).

The address translation process in the Virtualization technique varies from the standard MIPS address translation process in the following ways:

A kernel-only bit in TLB entries allows kernel-only pages to be freely mixed with user accessible pages in mapped memory regions accessible from user and supervisor modes.

Segment Configurations allow control of translation, access control and cache parameters for regions of the virtual address space.

An optional hardware page-table walk mechanism can be used with single or multi-level page tables to perform automatic TLB refills.

The Virtualization technique includes an option for two levels of address translation to be applied during guest-mode execution. The Virtualization technique requires that a TLB-based MMU is implemented in the root context.

The Virtualization technique provides a separate CP0 context for guest-mode execution. This context can optionally include segmentation controls and address translation (MMU). The guest MMU can be TLB-based, block address translation (BAT) or fixed mapping (FMT).

In guest mode when guest segmentation and translation are enabled, two levels of address translation are performed. The first level uses the guest context segmentation controls and the guest context MMU. This translates an address from a Guest Virtual address (GVA) to a Guest Physical Address (GPA). The second level of translation uses the root context TLB, using the GPA in place of the Virtual Address (VA) that would normally be used. This second translation results in a Physical Address (PA). The cache attribute used is supplied by the guest context.)

In guest mode when guest segmentation and translation are disabled or not present, the same process is followed, but only one level of address translation is required. The Guest Virtual Address has a 1:1 mapping to the Guest Physical Address, thus the Guest Virtual Address can be used directly with the root context TLB. Root context segmentation controls are ignored—the entire guest address space is translated. This translation results in a Physical Address (PA). The cache attribute is obtained from the root context TLB.

When full virtualization is required, it is recommended that the guest context contains a memory management unit (MMU). When a TLB-based guest MMU is provided, it is recommended that the number of entries be equal to the number of entries in the root-context TLB. The page sizes used in the root-mode TLB must be carefully considered to allow sufficient control for root-mode software, while maximizing the number of guest-mode TLB entries which are mapped through each root-mode TLB entry.

Paravirtualized systems can take advantage of the Virtualization features and provide good performance without requiring a guest context MMU. The page table used to reload the root TLB (using root-mode handlers) is controlled by root-mode software, based on information provided by the guest.

Operating systems provide demand paged virtual memory for use by user mode processes. Address translation is performed using a memory management unit, which usually includes a TLB. Each memory access must be translated based on the data from a page table entry found in the memory-resident page table. The TLB acts as a local cache of page table entries from the page table. Memory access are translated using page table entries held in the TLB and a software or hardware refilling system is triggered when an address to be translated is not found in the TLB. This system allows microprocessors to translate many memory accesses without accessing the page table in memory.

In a virtualized system, the operation of a guest's address translation system must appear to be unaltered to the guest operating system. The hypervisor must apply a second level of address translation to allow the physical memory space seen by the guest to be virtualized. A guest-virtual address is translated to a guest-physical address, which is then translated to a real-physical address. The disclosed system utilizes two-level address translation using separate TLBs. The separate TLBs may be linked by micro-TLB structures. The guest operating system and hypervisor have access to the separate TLBs.

When the system executes in guest mode, the normal privileged instructions and registers used to control address translation are applied to the guest-mode TLB. When the system executes in non-guest (root) mode, the normal privileged instructions and registers used to control address translation are applied to a root-mode TLB. The system is arranged such that it appears to software that each guest-mode memory access is being translated twice. Once through the guest TLB (controlled by the guest OS) and once through the root TLB (controlled by the hypervisor).

Microprocessor designs often use a structure known as a micro-TLB to enable a high performance pipeline to be built. The micro-TLB acts as a small cache into the main TLB, which is itself a cache of the page table in memory. The micro-TLBs typically contain a small number of entries, for example 4 or 8, and allow address translation to be performed very rapidly, often in parallel with instruction or data cache access. Memory accesses are translated using micro-TLB entries, and a hardware refilling system is triggered when an address to be translated is not found in the micro-TLB. This refilling system searches the main TLB. If the address is not found in the main TLB, the main TLB's refilling mechanism is triggered.

A modified micro-TLB re-fill mechanism is used in accordance with an embodiment of the invention. During guest-mode execution, when an address is not found in the micro-TLB, the refill system first checks the guest TLB. If a matching entry is found, the system obtains the physical page number from the matching guest TLB entry. An address derived from the guest TLB physical page number acts as the virtual address to be looked up in the root TLB. The root TLB is searched. If a matching entry is found, the real physical address is returned to the micro-TLB. Using this mechanism, the existing micro-TLB structures in a processor pipeline can be used to perform a direct translation from guest-virtual to real-physical, resulting in minimal loss of performance. The dual-translation step is performed only on micro TLB During the micro-TLB refill process, if no matching entry is found when searching the guest TLB, the guest's TLB refill process is triggered. If no matching entry is found when searching the root TLB, the root's TLB refill process is triggered.

This configuration results in a simple software architecture. Separate page tables are used by guest and hypervisor. The guest kernel maintains page tables for each of its processes. The hypervisor maintains page tables for each of guest OS. The hypervisor does not need any knowledge of the guest's page table or address translation setup. The hypervisor never needs to read or alter guest page tables, or trap on guest access to page tables. The mechanism enables high performance pipeline operations and provides a simple software architecture for virtualization. This stands in contrast to prior art techniques that implement second-level translation by the use of nested page tables or a form of block address translation. Nested page tables require knowledge of the guest operating system's page tables. This is possible in a microprocessor architecture with a hardware defined page table (e.g., Intel), but is more difficult in a system with software-managed TLB refills (e.g., MIPS). Use of nested page tables requires many memory accesses to be performed on each page table refill. The invention does not require the hypervisor to have any knowledge of the guest page tables, thereby reducing software complexity. The invention also allows existing software or hardware TLB refill processes to be used by both root and guest, as the software interface to each TLB is the same for each mode. The invention also allows larger pages to be used by the hypervisor than the guest, which means that the average number of memory accesses per guest TLB refill can be substantially reduced.

Figure 8:
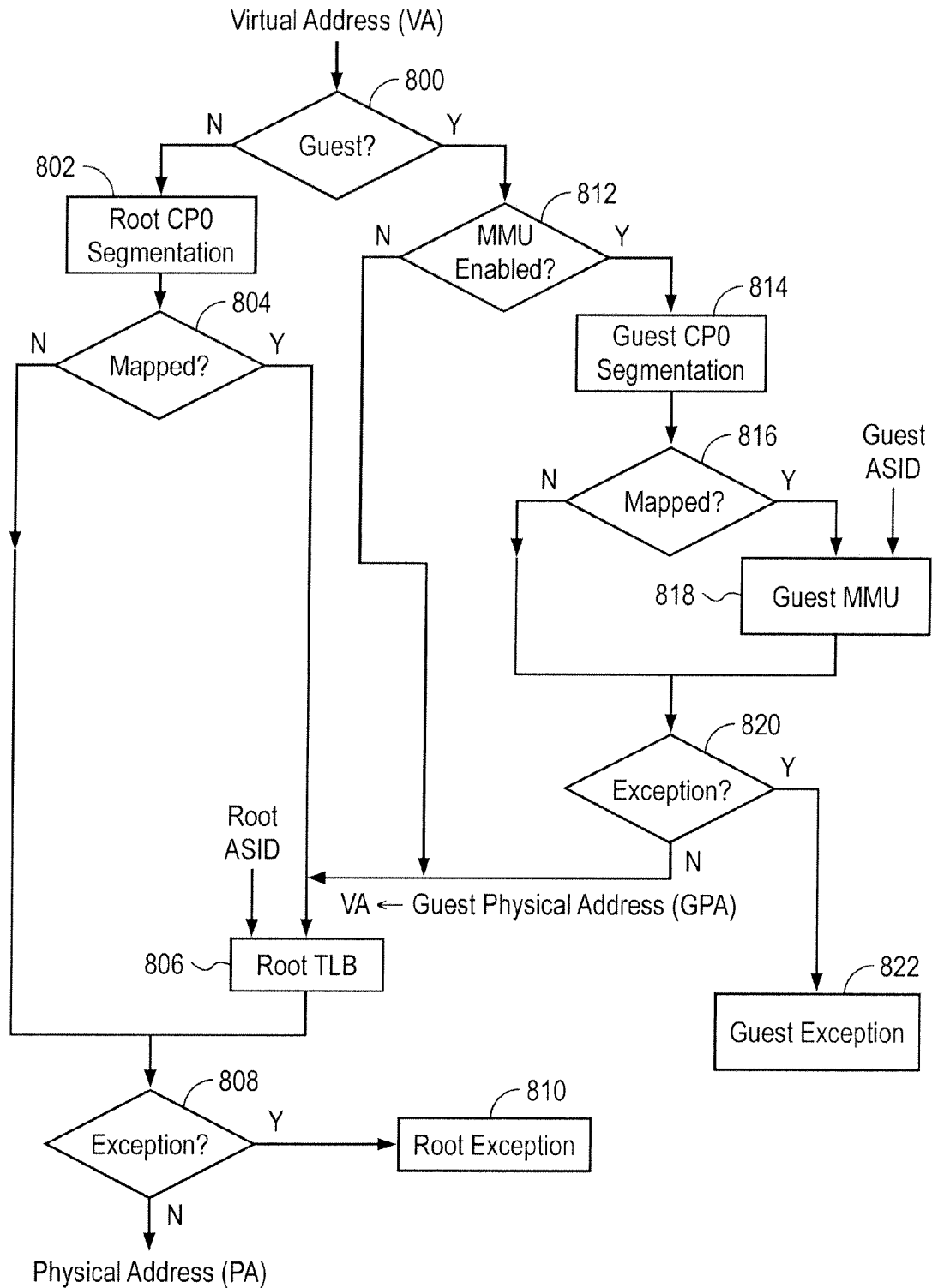
FIG. 8 illustrates dual level virtual address translation operations utilized in accordance with an embodiment of the invention.

FIG. 8 illustrates address translation in the Virtualization ASE. A virtual address is received. If the processor is not operating in a guest mode, (800-NO), then processing proceeds to root segmentation block 802. If the address is in an unmapped region of the root virtual address space (804-NO), the segmentation block provides the physical address. If the address is in a mapped region of the root virtual address space (804-YES), then the root TLB is invoked 806. If there is no exception (808-NO), then the physical address associated with the virtual address is known and can be returned. Otherwise, (808-YES), there is a root exception 810.

If the processor is operating in a guest mode (800-YES), it is determined whether the guest-context MMU is enabled. If not (812-NO), the virtual address is passed to the root TLB 806. If so (812-YES), guest segmentation process 814 is invoked. If the address is in an unmapped region of the guest virtual address space (816-NO), the guest physical address is provided by the guest segmentation block. If the address is in a mapped region of the guest virtual address space (816-YES), the guest MMU 818 is accessed. If there is an exception (820-YES), a guest exception 822 exists and is processed in guest mode. Otherwise (820-NO), the guest physical address is known and is passed to the root TLB 806 as a virtual address. If the root TLB lookup results in an exception (808-YES), a root exception is processed in root mode. If no exception is detected (808-NO), the physical address associated with the guest virtual address is known and can be returned.

Processor designs incorporating the Virtualization technique and implementing a guest context MMU are unlikely to perform translation twice on each memory access. A hardware mechanism may be used to ensure that a Physical Address can be obtained from a Guest Virtual Address within the CPU pipeline in a single translation. The mechanism may use micro-TLBs. For example, on a micro-TLB refill a guest TLB lookup would be followed by a root TLB lookup, to produce a one-step GVA-PA translation to be stored in the micro-TLB. Other methods are also possible. The system is arranged to allow for efficient execution and to appear to software that two independent translation steps are taking place for each memory access. Guest mode segmentation controls and the guest mode MMU have no effect on the root mode address space.

The pseudocode below describes the complete address translation process for the MIPS Virtualization ASE. Segmentation, TLB lookups, hardware TLB refill and second-level address translation are invoked below. The process is described in top-down order.

```
/* Inputs
*       vAddr       - Virtual Address
*       IodD        - Access type - INSTRUCTION or DATA
*       LorS        - Access type - LOAD or STORE
*       pLevel      - Privilege level - USER, SUPER, KERNEL
*
*       Outputs
*       pAddr - physical address (valid when mapped)
*       CCA - cache attribute (valid when mapped)
*
*       Exceptions: See called functions
*       Can be called from guest or root context.
*/
subroutine AddressTranslation(vAddr, IorD, LorS, pLevel)
if (Root.IsGuestMode( ) and Root.GuestControl_ST=0) then
# Guest mode without segmentation/translation
```

```
# - address is 1:1 translation
# - CCA always comes from root TLB (so it is not set here)
pAddr ← vAddr
CCA ← UNPREDICTABLE
else
# Use Segmentation and MMU in current context
# - in root mode
# - in guest mode, with segmentation/translation enabled
case Config_MT
1 :# Segmentation and Standard TLB
# Determine whether address is mapped
# - if unmapped, obtain physical address and cache attribute
(mapped, pAddr, CCA) ←
SegmentLookup(vAddr, pLevel, IorD, LorS)
# Mapped regions - Search TLB
if (mapped) then
(pAddr, CCA) ← TLBLookup(EntryHi_ASID, vAddr, pLevel, IorD,LorS)
endif
# All other cases
# - FMT, BAT and VTLB/FTLB are applied here
# - MMU=None case is undefined
default :
UNDEFINED
endcase
endif
# Secondary address translation
# - always applied to guest mode accesses
if (Root.IsGuestMode( )) then
# Re-translate Guest Physical Address
# - using guest privilege level, root ASID
gpAddr ← pAddr
gCCA ← CCA
# Search TLB (can take exception):
# pAddr = physical address, CCA = cache attribute
(pAddr, CCA) ← Root.TLBLookup(Root.EntryHi_ASID, gpAddr, pLevel)
# When guest segmentation/translation present, use #guest's CCA
# - otherwise use cache attr from root TLB entry
if (GuestControl_ST=1) then
CCA ← gCCA
endif
endif
return(pAddr, CCA)
endsub
```

The privilege level of a CP0 context may be determined as follows:

```
subroutine PrivilegeLevel( ) :
if ((Root.Debug_DM=1) or (Status_ERL=1) or Status_EXL=1) then
priv ← KERNEL
else
case Status_KSU
00_2 : pLevel ← KERNEL
01_2 : pLevel ← SUPER
10_2 : pLevel ← USER
endcase
endif
return(pLevel)
endsub
```

Guest mode operation may be determined as follows:

```
subroutine IsGuestMode( ) :
if          (Root.GuestControl_GM=1) and (Root.DebugDM=0) and
(Root.Status_ERL=0) and (Root.Status_EXL=0) then
return(true)
else
return(false)
endif
endsub
```

The Virtualization technique includes programmable segmentation. This improves the flexibility of the MIPS address space and enables 'classic' virtualization.

The MIPS architecture is split into a number of equally sized segments. The behavior of each region is controlled by a Segment Configuration. A minimum of eight MIPS Segment Configurations is present. The number of MIPS Segments is indicated by a register field (e.g., SegmentIndex$_{NSeg}$.

Segment Configurations are always active. Coprocessor 0 registers SegnentCtl and SegmentIndex are used to set the following parameters for each Segment Configuration:

Access permissions from user, kernel, and supervisor modes

Enable mapping (address translation) using the MMU specified in a register (e.g., Config$_{MT}$).

Physical address when mapping is disabled

Cache attribute when mapping is disabled

Force to unmapped, uncached when Status$_{ERL}$=1

On reset, all Segment Configurations default to be backward compatible with MIPS. The system can be used to implement a fully translated flat address space, or used to alter the relative size of cached and uncached windows into the physical address space. Operation of the MIPS segmentation controls is characterized as follows:

```
/* Inputs
*       vAddr - Virtual Address
*       pLevel - Privilege level - USER, SUPER, KERNEL
*
*       Outputs
*       mapped - segment is mapped
* pAddr - physical address (valid when mapped)
* CCA   - cache attribute (valid when mapped)
* IorD       - Access type - INSTRUCTION or DATA
* LorS  - Access type - LOAD or STORE
*
*       Exceptions: Address Error
*/
subroutine SegmentLookup(vAddr, pLevel, IorD, LorS) :
SegmentM32 ← (vAddr >> 29) AND 111₂
# Read from Segmentation Configurations
# 32-bit address space
IndexBits    ← SegmentIndex_{NSeg}+3
SegmentLSB ← 32-IndexBits
Segment ← (vAddr >> SegmentLSB) AND ((1<<IndexBits)−1)
AM      ← SC[Segment].AM
EU      ← SC[Segment].EU
PA      ← SC[Segment].PA
C       ← SC[Segment].C
# Segment mapping
case AM
UK:     mapped ← 0
MK:     mapped ← 1
MSK:    mapped ← 1
MUSK:   mapped ← 1
MUSUK:  mapped ← (pLevel != KERNEL)
UUSK:   mapped ← 0
default: mapped ← UNDEFINED
endcase
# Segment access control
case AM
UK:     seg_err ← (pLevel != KERNEL)
MK:     seg_err ← (pLevel != KERNEL)
MSK:    seg_err ← (pLevel = USER)
MUSK:   seg_err ← 0
MUSUK:  seg_err ← 0
UUSK:   seg_err ← 0
default: seg_err ← UNDEFINED
endcase
# Segment Cache attribute
CCA      ← C
# Special case - kseg0 cache attribute
if (SegmentM32=100₂) and (SegmentIndex_{K0}=0) then
   CCA ← Config_{K0}
endif
# Special case - Error-Unmapped region when ERL=1
if (EU = 1) and (Status_{ERL}=1) then
   CCA ← 2       # uncached
   mapped ← 0   # unmapped
endif
# Physical address for unmapped use
SegMask ← ~(0xFFFF_FFFF << SegmentLSB)
pAddr   ← (PA << SegmentLSB) OR (vAddr AND SegMask)
# Address error
if (seg_err) then
 if (IorD = INSTRUCTION) then
   reftype ← FETCH
 else
   if (LorS = LOAD) then
     reftype ← LOAD
   else
     reftype ← STORE
   endif
 endif
 SignalException(AddrError, reftype)
endif
return (mapped, pAddr, CCA)
endsub
```

The Virtualization technique extends the TLB organization defined by the MIPS architecture. The translation section is augmented by one additional bit, K (Kernel only), which can be thought of as a qualifier for the existing V (Valid) bit. One segment can contain pages accessible from user mode and pages accessible only from kernel mode. The boundary between user and kernel-only areas of the translated address space can be flexible, allowing for efficient use of translated memory regions.

The translation section still contains two parts—each TLB entry maps an aligned pair of virtual pages, and the pair of physical translation entries corresponds to the even and odd pages of the pair.

Figure 9:
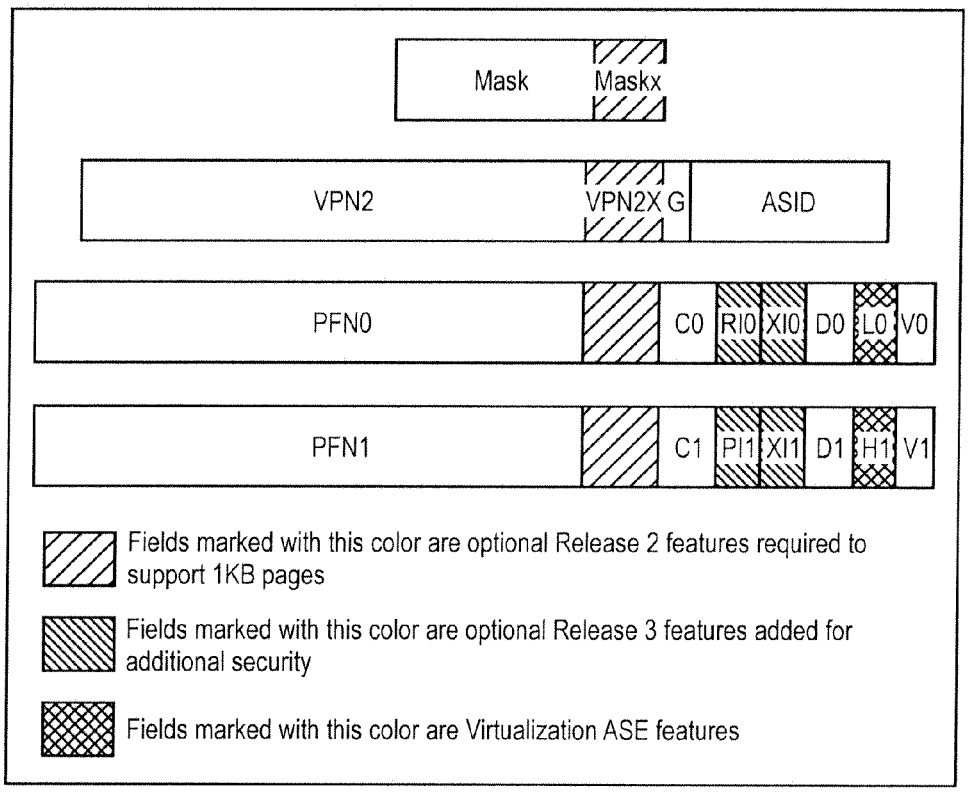
FIG. 9 illustrates a TLB configuration utilized in accordance with an embodiment of the invention.

FIG. 9 shows the logical arrangement of a TLB entry configured in accordance with an embodiment of the invention. The fields of the TLB entry correspond to the fields in the CP0 PageMask, EntryHi, EntryLo0 and EntryLo1 registers of the MIPS architecture. The even page entries in the TLB (e.g., PFN0) come from EntryLo0. Similarly, odd page entries come from EntryLo1. The modified TLB lookup process is as follows:

```
/* Inputs
*          asid - address space identifier
*          vAddr - Virtual Address
*          pLevel - Privilege level - USER, SUPER, KERNEL
*          IorD - Access type - INSTRUCTION or DATA
*          LorS - Access type - LOAD or STORE
*
*          Outputs
*          pAddr - physical address
*          CCA - cache attribute
*
*          Exceptions: TLB Modified, TLB Invalid, TLB Refill,
TLBXI, TLBRI
*/
subroutine TLBLookup(asid, vAddr, pLevel, IorD, LorS):
# Type of reference, for exception handling
if (IorD = INSTRUCTION) then
 reftype ← FETCH
else
 if (LorS = LOAD) then
   reftype ← LOAD
 else
   reftype ← STORE
 endif
```

-continued

```
endif
found ← 0
for i in 0...TLBEntries−1
  if((TLB[i]_{VPN2} and not (TLB[i]_{Mask})) = (vAddr_{31..11} and not
    (TLB[i]_{Mask})) and (TLB[i]_G or (TLB[i]_{ASID} = asid) then
    # EvenOddBit selects between even and odd halves of #the TLB as
    # a function of the page size in the matching TLB #entry
    effective_mask ← TLB[i]_{Mask}
    case effective_mask
      0000000000000_2: EvenOddBit ← 10
      0000000000001_2: EvenOddBit ← 11
      0000000000011_2: EvenOddBit ← 12
      0000000001111_2: EvenOddBit ← 14
      0000000111111_2: EvenOddBit ← 16
      0000011111111_2: EvenOddBit ← 18
      0000111111111_2: EvenOddBit ← 20
      0011111111111_2: EvenOddBit ← 22
      1111111111111_2: EvenOddBit ← 24
      otherwise: UNDEFINED
    endcase
    found ← 1         # matched an entry
    f      ← i # index of matched entry
    break
  endif
endfor
# Hardware TLB miss handling
# Exception/error during page table walk returns with found = 0
# Matched-entry index (f) is updated when a new entry is loaded

if (found = 0) then
         (found, f) ← PageTableWalkRefill(vAddr)
endif
# Entry not in TLB, PTW did not run or did not complete
if (found = 0) then
  SignalException(TLBMiss, reftype)
endif
# Extract data from TLB entry
if vAddr_{EvenOddBit} = 0 then
  pfn    ← TLB[f]_{PFN0}
  v      ← TLB[f]_{V0}
  c      ← TLB[f]_{C0}
  d      ← TLB[f]_{D0}
  k      ← TLB[f]_{K0}
  ri     ← TLB[f]_{RI0}
  xi     ← TLB[f]_{XI0}
else
  pfn    ← TLB[f]_{PFN1}
  v      ← TLB[f]_{V1}
  c      ← TLB[f]_{C1}
  d      ← TLB[f]_{D1}
  k      ← TLB[f]_{K1}
  ri     ← TLB[f]_{RI1}
  xi     ← TLB[f]_{XI1}
endif
pAddr ← pfn_{(PABITS−1)−10..EvenOddBit−10} || vAddr_{EvenOddBit−1..0}
# Permissions checks
if ((v = 0) or ((k = 1) and (pLevel != KERNEL))) then
  SignalException(TLBInvalid, reftype)
endif
if ((d = 0) and (reftype = STORE)) then
  SignalException(TLBModified, reftype)
endif
if (Config3_{RXI} or Config3_{SM}) then
  if ((ri = 1) and (reftype = LOAD)) then
    if (xi = 0 and (IsPCRelativeLoad(PC)) then
    # PC relative loads are allowed where execute #is allowed
    else
      if (PageGrain_{IEC}=1) then
        SignalException(TLBRI, reftype)
      else
        SignalException(TLBInvalid, reftype)
      endif
    endif
  endif
  if ((xi = 1) and (reftype = FETCH)) then
    if (PageGrainIEC=1) then
      SignalException(TLBXI, reftype)
    else
      SignalException(TLBInvalid, reftype)
    endif
  endif
endif
endif
CCA ← c
return(pAddr, CCA)
endsub
```

The invention provides a virtualized interrupt system for the guest. The root context interrupt system is always active, even during guest mode execution. Guests cannot disable root mode interrupts. Standard MIPS interrupt rules are used by both root and guest contexts to determine when an interrupt should be taken. An asserted interrupt source enabled by the root context will result in a root mode interrupt. An asserted interrupt source which is delivered to the guest context and is enabled in the guest context is taken in guest mode. Root interrupts take priority over guest interrupts.

Figure 10:
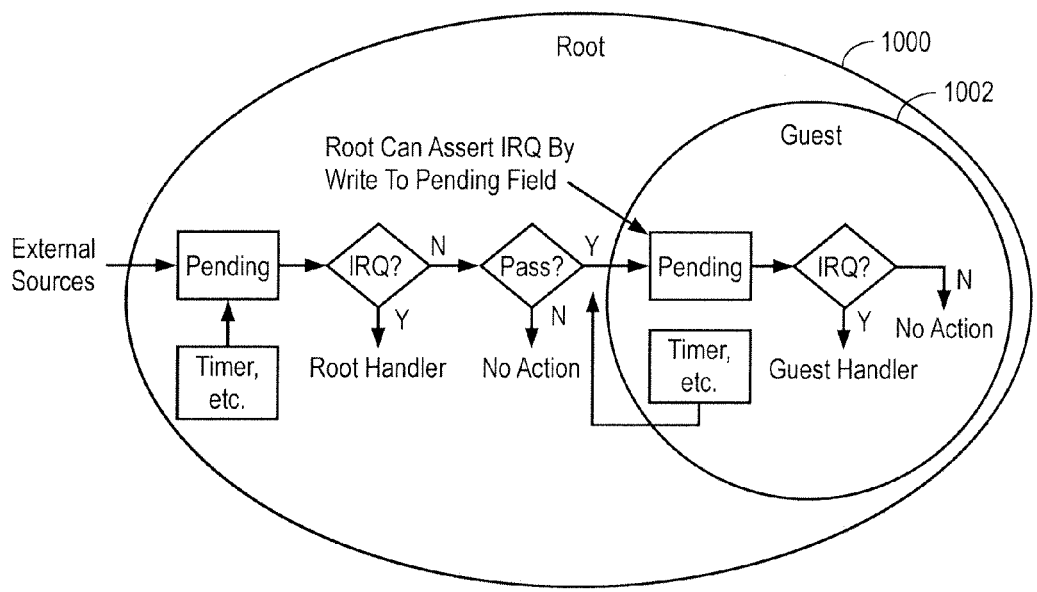
FIG. 10 illustrates external exception processing utilized in accordance with an embodiment of the invention.

FIG. 10 illustrates the Virtualization 'onion model' applied to interrupt sources. Starting on the left of the figure, an interrupt signal from an external source is initially tested by the root 1000. If the interrupt is relevant to the root, then it is handled at the root. If the interrupt signal is to be delivered to the guest context, it is passed to the guest 1002. Interrupts generated within the guest 1002 are handled at the guest, for example a guest timer interrupt. A designated guest-context register field is the source of guest interrupts. The behavior of this field is controlled from the root context. Three methods can be used to trigger guest interrupts -a root-mode write to bits within the specified register, a direct assignment of an external interrupt signal to the guest interrupt system, or use of an interrupt signal generated within the guest context. Interrupt sources are combined such that all three methods can be used.

Timers and related interrupts are available in both guest and root contexts. The set of pending interrupts seen by the guest context is the combination (logical OR) of:

External interrupts passed through from the root context,
Interrupts generated within the guest context (e.g. Timer),
Root asserted interrupts (write to bits within the specified register).

Software should enable direct interrupt assignment only when root and guest agree on the interpretation of interrupt pending/enable fields in Status and Cause registers.

The Virtualization technique adds guest-mode context to duplicate privileged state, which is located in Coprocessor 0. All machine state located outside Coprocessor 0 is shared by guest and root contexts. The guest and root contexts share the same general purpose registers and shadow register sets. The register set in use by guest mode is determined by a specified register field. The register set in use by root mode is determined by a separately specified register field. Access to general purpose registers is always unrestricted. However, control over which register set is in use by the guest is restricted to root-mode software.

Root-mode software is exclusively responsible for setting up access to shadow register sets on behalf of guests, and ensuring that the proper allocation of shadow register sets for guest and root-mode interrupt and exception handlers.

The guest and root contexts share the DSP ASE, if it is implemented. The DSP ASE is available to the guest context when enabled through a specified register field. During guest mode execution, access to the DSP ASE is controlled by status bits from both the root and guest contexts.

The guest and root contexts share the Floating Point Unit, if it is implemented. The floating point unit is available to the guest context when enabled through a specified register field.

Similarly, the guest and root contexts share coprocessor 2, if it is implemented. Coprocessor 2 is available to the guest context when a specified register field is set.

The MIPS MT ASE defines a set of instructions and machine state which are used to implement multi-threading (MT). The presence of the MT ASE is indicated by a specified register field. Like the Virtualization ASE, the MT ASE provides duplicate Coprocessor 0 state. A single MIPS CPU can contain multiple Virtual Processing Elements (VPEs). Each of these VPEs uses a separate set of general purpose registers (GPRs), and a separate CP0 context. Mechanisms for controlling one VPE from another are provided, to allow for system initialization and control.

Each VPE runs a separate and independent program or thread. Switching between VPEs happens very rapidly, even on a cycle-by-cycle basis. When used in a Symmetric Multi-Processing (SMP) configuration, the MT ASE allows a single CPU core to appear to software as multiple CPU cores which are simultaneously executing, using the same physical address space accessed through a common set of L1 caches.

Figure 11:
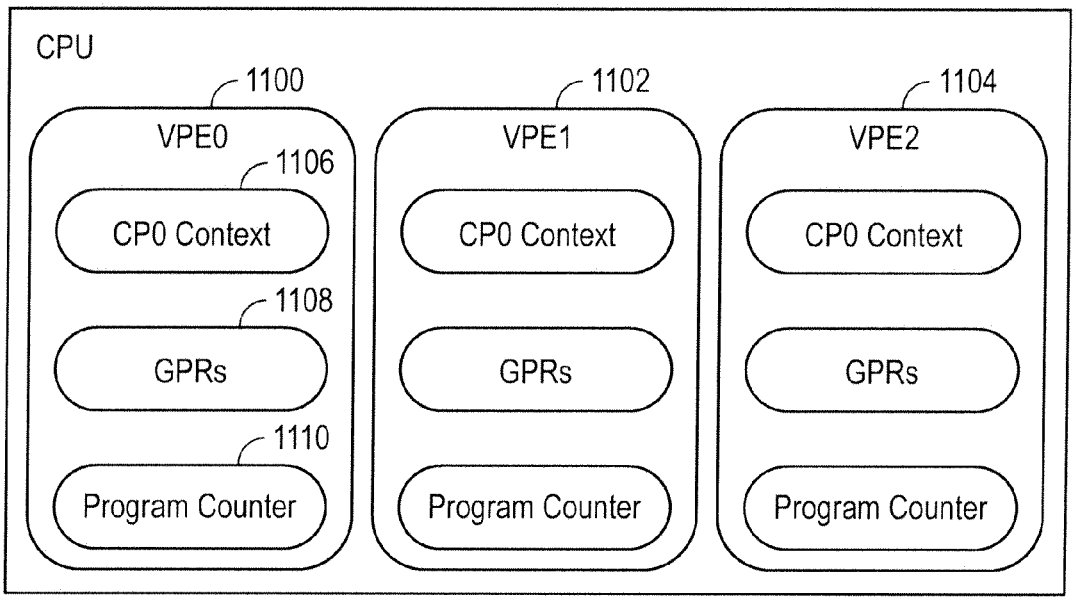
FIG. 11 illustrates virtual processing elements utilized in accordance with the prior art.
Figure 12:
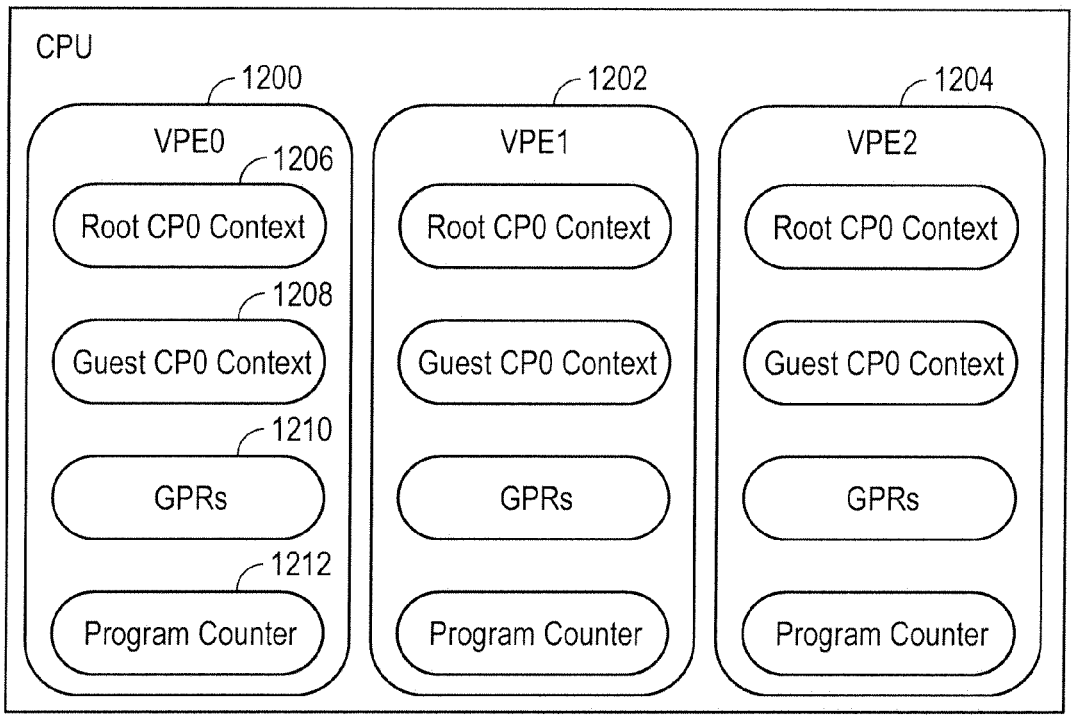
FIG. 12 illustrates virtual processing elements with root and context information utilized in accordance with an embodiment of the invention.

FIG. 11 illustrates a MT ASE processor equipped with three VPEs 1100, 1102 and 1104. Each VPE includes CP0 context 1106, general purpose registers 1108 and a program counter 1110. FIG. 12 illustrates an MT ASE processor configured for VPEs implementing guest operations of the invention. The figure illustrates three VPEs 1200, 1202 and 1204. Each VPE includes root CPU context 1206, guest CP0 context 1208, general purpose registers 1210 and a program counter 1212.

The Virtualization technique enables virtualization for a single thread of execution. Multiple CP0 contexts are present (guest and root), but general purpose registers (GPRs) and coprocessor registers are shared. A single thread of execution covers the hypervisor software, guest kernel software, and guest-user software. The Virtualization technique and MT ASE can co-exist in the same processor. Each VPE is treated like a separate processor—the pre-existing machine state of each VPE is accessible to root mode, and the new guest mode and guest CP0 context are added.

Hypervisor software running on each VPE manages the thread of execution for that VPE—as in a multi-core system. The hypervisor software controls the physical address space and privileges of each guest, for example whether the VPEs share a common physical address space (e.g. a SMP machine) or are configured to be entirely separate. A trap-and-emulate approach is required for full virtualization of a guest which uses the MT ASE.

When multiple guest virtual machines are running on a single-threaded machine, switches between guests occur tens, hundreds or thousands of times per second. When a context switch takes place the outgoing guest's machine state is read out and saved, and the incoming guest's machine state is loaded and restored. The processor is controlled by one hypervisor instance, which is in control of the root context.

When multiple guest virtual machines are running on a multi-core machine, switches between guests on each core may still occur tens or hundreds of times per second, using the context switch method. However, multiple guests can be run simultaneously—one on each processor core. A distinct hypervisor instance on each processor is in control of that processor's root context. Hypervisor instances communicate to achieve shared goals, as in a traditional SMP system.

A similar arrangement is used when multiple guest virtual machines are running on a single-core multi-threaded machine. Switches between guests are achieved on a cycle-by-cycle basis—as the processor switches between VPEs. Multiple guests can run simultaneously—one on each VPE. A distinct hypervisor instance on each VPE is in control of that VPE's root context.

This concept can be further extended to a multi-threaded, multi-core machine. Each processor core features multiple VPEs, each of which has its own guest context. A distinct hypervisor instance is present on each VPE and is in control of the root context.

The MT ASE and Virtualization technique provide complementary feature sets, which allow hypervisor software the flexibility to schedule guest virtual machines on separate cores, on separate VPEs, and to schedule using traditional time-sharing methods.

Figure 13:
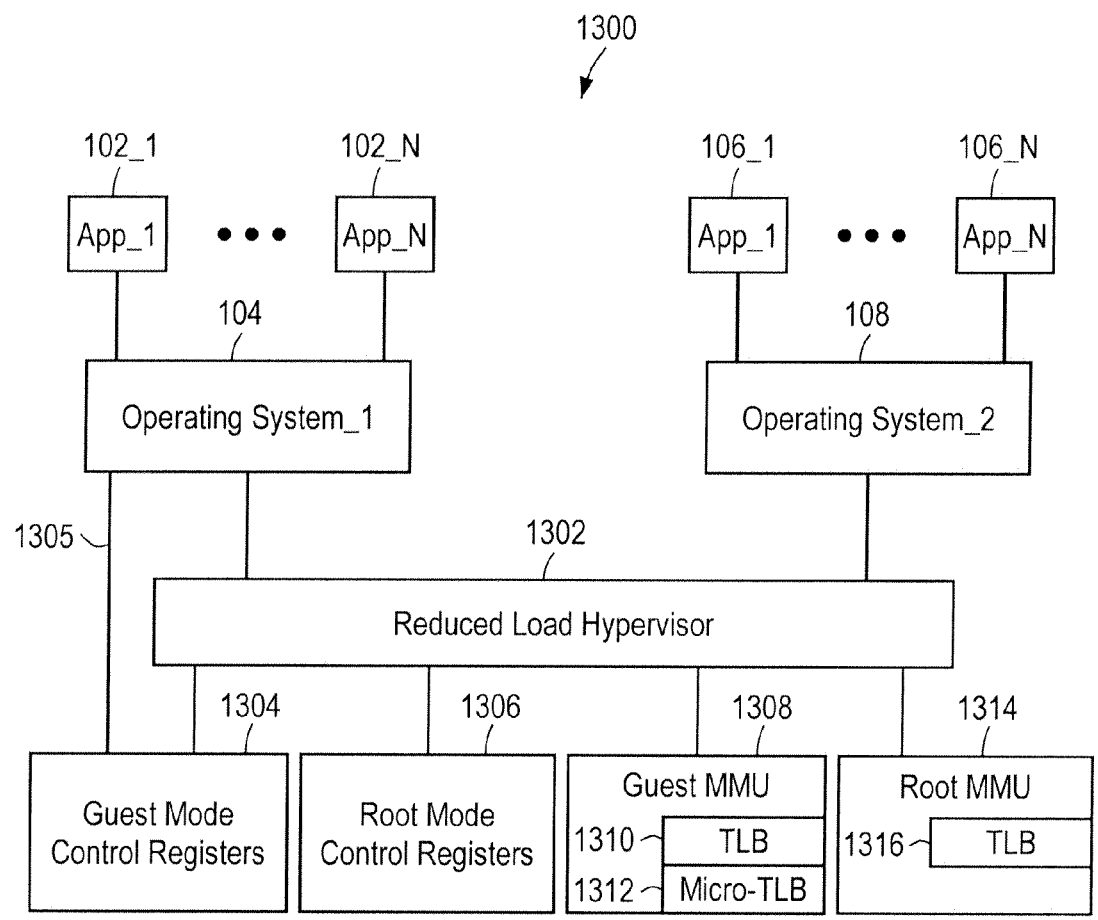
FIG. 13 illustrates a system virtualized in accordance with the invention.

FIG. 13 illustrates a system 1300 virtualized in accordance with the invention. The system 1300 corresponds to the system of FIG. 1 with respect to the utilization of a first operating system 104 to support a first set of applications 102_1 through 102_N and a second operating system 108 to support a second set of applications 106_1 through 106_N. However, unlike the system of FIG. 1, the system of FIG. 13 utilizes a reduced load hypervisor 1302. The reduced load stems from guest mode hardware support features. These hardware support resources include guest mode control registers 1304 and root mode control registers 1306. In addition, as discussed above, a guest mode MMU 1308 with an associated TLB 1310 and micro-TLB 1312 may be accessed by the reduced load hypervisor 1302. The guest MMU 1308 may be directly accessed by any guest operating system (e.g., 104 or 108), if permitted by the hypervisor 1302. In addition, a root MMU with an associated TLB 1316 the may also be utilized by the reduced load hypervisor 1302. Separate MMUs are depicted for conceptual purposes. It should be appreciated that a single MMU with a first section performing guest operations and a second section performing root operations may also be used. In addition, the micro-TLB 1312 does not need to be part of the TLB 1310. The micro-TLB 1312 may be implemented in the processor pipeline.

FIG. 13 illustrates a line 1305 between the operating system 104 and the guest mode control registers 1304. This serves to illustrate that the guest mode control registers 1304 are accessible by guest operating systems (e.g., 104 and 108)

While various embodiments of the invention have been described above, it should be understood that they have been presented by way of example, and not limitation. It will be apparent to persons skilled in the relevant computer arts that various changes in form and detail can be made therein without departing from the scope of the invention. For example, in addition to using hardware (e.g., within or coupled to a Central Processing Unit ("CPU"), microprocessor, microcontroller, digital signal processor, processor core, System on chip ("SOC"), or any other device), implementations may also be embodied in software (e.g., computer readable code, program code, and/or instructions disposed in any form, such as source, object or machine language) disposed, for example, in a computer usable (e.g., readable) medium configured to store the software. Such software can enable, for example, the function, fabrication, modeling, simulation, description and/or testing of the apparatus and methods described herein. For example, this can be accomplished through the use of general programming languages (e.g., C, C++), hardware description languages (HDL) including Verilog HDL, VHDL, and so on, or other available programs. Such software can be disposed in any known computer usable medium such as semiconductor, magnetic disk, or optical disc (e.g., CD-ROM, DVD-ROM, etc.).

It is understood that the apparatus and method described herein may be included in a semiconductor intellectual property core, such as a microprocessor core (e.g., embodied in HDL) and transformed to hardware in the production of integrated circuits. Additionally, the apparatus and methods described herein may be embodied as a combination of hardware and software. Thus, the present invention should not be limited by any of the above-described exemplary embodiments, but should be defined only in accordance with the following claims and their equivalents.

The invention claimed is:

1. A processor, comprising:
a first translation look-aside buffer to support a guest operating mode;
a second translation look-aside buffer to support a root operating mode; and
hardware resources supporting the guest operating mode controlled by guest mode control registers defining guest context, wherein the guest context is used by the hardware resources to access the first translation look-aside buffer to translate a guest virtual address to a guest physical address, and the hardware resources access the second translation look-aside buffer to translate the guest physical address to a physical address.

2. The processor of claim 1 wherein the first translation look-aside buffer and the second translation look-aside buffer each include a kernel mode parameter bit.

3. The processor of claim 2 wherein the kernel mode parameter bit allows kernel-only pages to be mixed with user accessible pages in mapped memory.

4. The processor of claim 1 wherein the first translation look-aside buffer has an associated micro-translation look-aside buffer.

5. The processor of claim 4 wherein an address hit in the micro-translation look-aside buffer returns a physical page number.

6. The processor of claim 4 wherein an address miss in the micro-translation look-aside buffer results in a check of the first translation look-aside buffer.

7. The processor of claim 4 wherein an address hit in the first translation look-aside buffer secures a physical page number that operates as a virtual address to be looked up in the second translation look-aside buffer.

8. The processor of claim 7 wherein a virtual address hit in the second translation look-aside buffer yields a physical address returned to the micro-translation look-aside buffer.

9. The processor of claim 4 wherein a virtual address miss in the first translation look-aside buffer initiates a first translation look-aside buffer refill process using guest privileged context.

10. The processor of claim 7 wherein a virtual address miss in the second translation look-aside buffer initiates a second translation look-aside buffer refill process using root privileged context.

11. The processor of claim 1 executing a hypervisor that does not have knowledge of guest page tables.

12. The processor of claim 1 executing a hypervisor that does not have knowledge of address translation setup.

* * * * *